(12) United States Patent
Peng et al.

(10) Patent No.: US 7,684,181 B2
(45) Date of Patent: Mar. 23, 2010

(54) MOUNTING APPARATUS FOR STORAGE DEVICE

(75) Inventors: Wen-Tang Peng, Taipei Hsien (TW); Xin-Hu Gong, Shenzhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 5 days.

(21) Appl. No.: 11/965,765

(22) Filed: Dec. 28, 2007

(65) Prior Publication Data

US 2009/0103252 A1   Apr. 23, 2009

(30) Foreign Application Priority Data

Oct. 17, 2007   (CN) .................... 2007 1 0202101

(51) Int. Cl.
G06F 1/16 (2006.01)
(52) U.S. Cl. .............. 361/679.33; 369/75.2; 312/333; 360/97.01; 248/697
(58) Field of Classification Search ........... 361/679.17, 361/679.3, 679.33, 679.34–679.41; 369/75.1, 369/75.2; 312/332.1, 333; 292/113; 360/97.01; 248/694–697

See application file for complete search history.

(56) References Cited

U.S. PATENT DOCUMENTS

| 7,492,586 | B2 * | 2/2009 | Peng et al. | ........... 248/694 |
| 2007/0025014 | A1 * | 2/2007 | Kim | ........... 360/97.01 |
| 2008/0259554 | A1 * | 10/2008 | Qin et al. | ........... 361/685 |

FOREIGN PATENT DOCUMENTS

CN    2303362 Y    1/1999

* cited by examiner

Primary Examiner—Hung V Duong
(74) Attorney, Agent, or Firm—Frank R. Niranjan

(57) ABSTRACT

A mounting apparatus is provided for a storage device. The storage device includes two lateral sides each defining at least one fixing hole. The mounting apparatus includes a conductive bracket having two side plates, and at least one fastener installed on an inside surface of each of the side plates. Each fastener includes a conductive elastic portion fixed to the corresponding side plate, and a conductive fixing portion extending from the elastic portion and perpendicular to the corresponding side plate. The elastic portions engage with the lateral sides of the storage device respectively, the fixing portions engage in the fixing holes of the storage device respectively.

9 Claims, 5 Drawing Sheets

US 7,684,181 B2

MOUNTING APPARATUS FOR STORAGE DEVICE

BACKGROUND

1. Field of the Invention

The present invention relates to mounting apparatuses, and more particularly to a mounting apparatus for a storage device.

2. Description of Related Art

An electronic apparatus, such as a typical desktop computer, tower computer, server, or the like, usually includes storage devices, such as hard disk drives, compact disk read-only memory (CD-ROM) drives, digital video disc (DVD) drives, floppy disk drives, and the like. These devices are typically added to increase the functionality of the electronic apparatus as desired by a user.

The installation of a hard disk drive in a computer typically involves the use of screws to attach the hard disk drive to a bracket of a computer chassis and connect the hard disk drive to ground. However, these screws are usually too small and difficult to handle. Additionally, because of their small size, the screws are easily dropped, by an assembler, into the computer.

To address the aforementioned problems, a plurality of mounting apparatuses is invented to reduce the number of needed screws. For example, a pair of detachable rails is attached to opposite sides of a storage device with screws. The storage device is then slid into and secured to a drive bracket. The screws provide both a means to fix the storage device in place and provide a path to ground. However, because the screws are directly engaged in the rails and the storage device, the storage device is apt to be damaged by vibrations transmitted through the screws.

What is needed, therefore, is a mounting apparatus which is able to provide better protection to a storage device without screws and still provide the storage device a path to ground.

SUMMARY

An exemplary mounting apparatus is provided for a storage device. The storage device includes two lateral sides each defining at least one fixing hole. The mounting apparatus includes a conductive bracket having two side plates, and at least one fastener installed on an inside surface of each of the side plates. Each fastener includes a conductive elastic portion fixed to the corresponding side plate, and a conductive fixing portion extending from the elastic portion and perpendicular to the corresponding side plate. The elastic portions engage with the lateral sides of the storage device respectively, the fixing portions engage in the fixing holes of the storage device respectively.

Other advantages and novel features will become more apparent from the following detailed description of embodiments when taken in conjunction with the accompanying drawings, in which:

DETAILED DESCRIPTION

Figure 1:
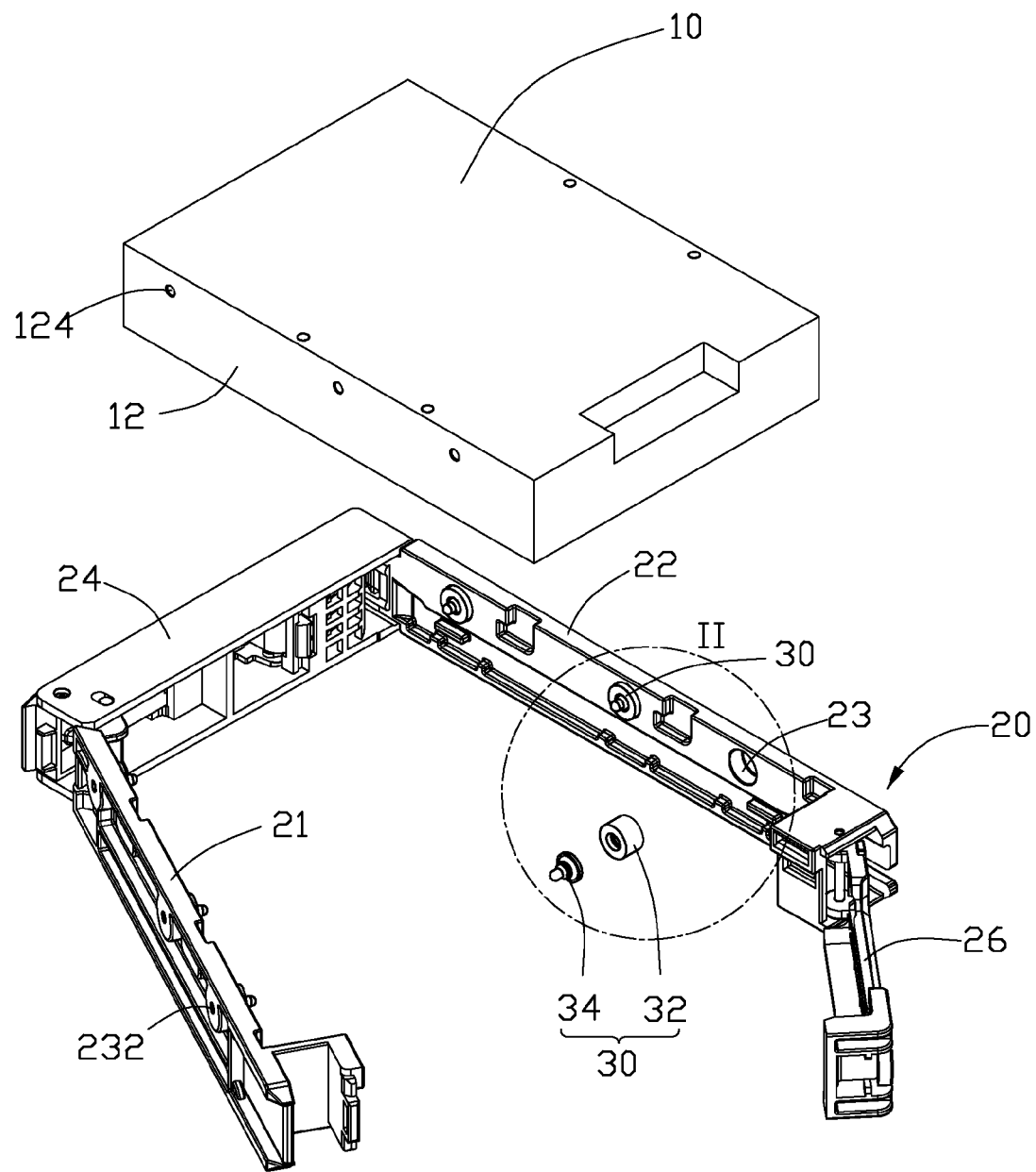
FIG. 1 is an exploded, isometric view of a mounting apparatus with a storage device in accordance with an embodiment of the present invention.

Referring to FIG. 1, a mounting apparatus for a storage device is provided in accordance with an embodiment of the present invention. The mounting apparatus includes a bracket 20 for receiving a storage device 10, and a plurality of fasteners 30 installed to the bracket 20.

The storage device 10 includes two opposite lateral sides 12, and each lateral side 12 defines three spaced fixing holes 124 therein.

The bracket 20 is made of electrically conductive material such as metal, or plastic material combined with metal. The bracket 20 includes two opposite side plates 21, 22, an end plate 24 connecting with rear ends of the side plates 21, 22, and a pivoting plate 26 connecting with front ends of the side plates 21, 22. A receiving space is defined among the side plates 21, 22, the end plate 24, and the pivoting plate 26. One end of the end plate 24 is fixed to the side plate 22, and the opposite end of the end plate 24 is pivotably connected to the side plate 21. One end of the pivoting plate 26 is pivotably connected to the side plate 22, and the opposite end of the pivoting plate 26 is disengagably connected to the side plate 21. An inside surface of each of the side plates 21, 22 defines three recesses 23, and an outside surface of each of the side plates 21, 22 defines three venting holes 232 communicating with the corresponding recesses 23. Diameter of each venting hole 232 is smaller than that of the corresponding recess 23.

Figure 2:
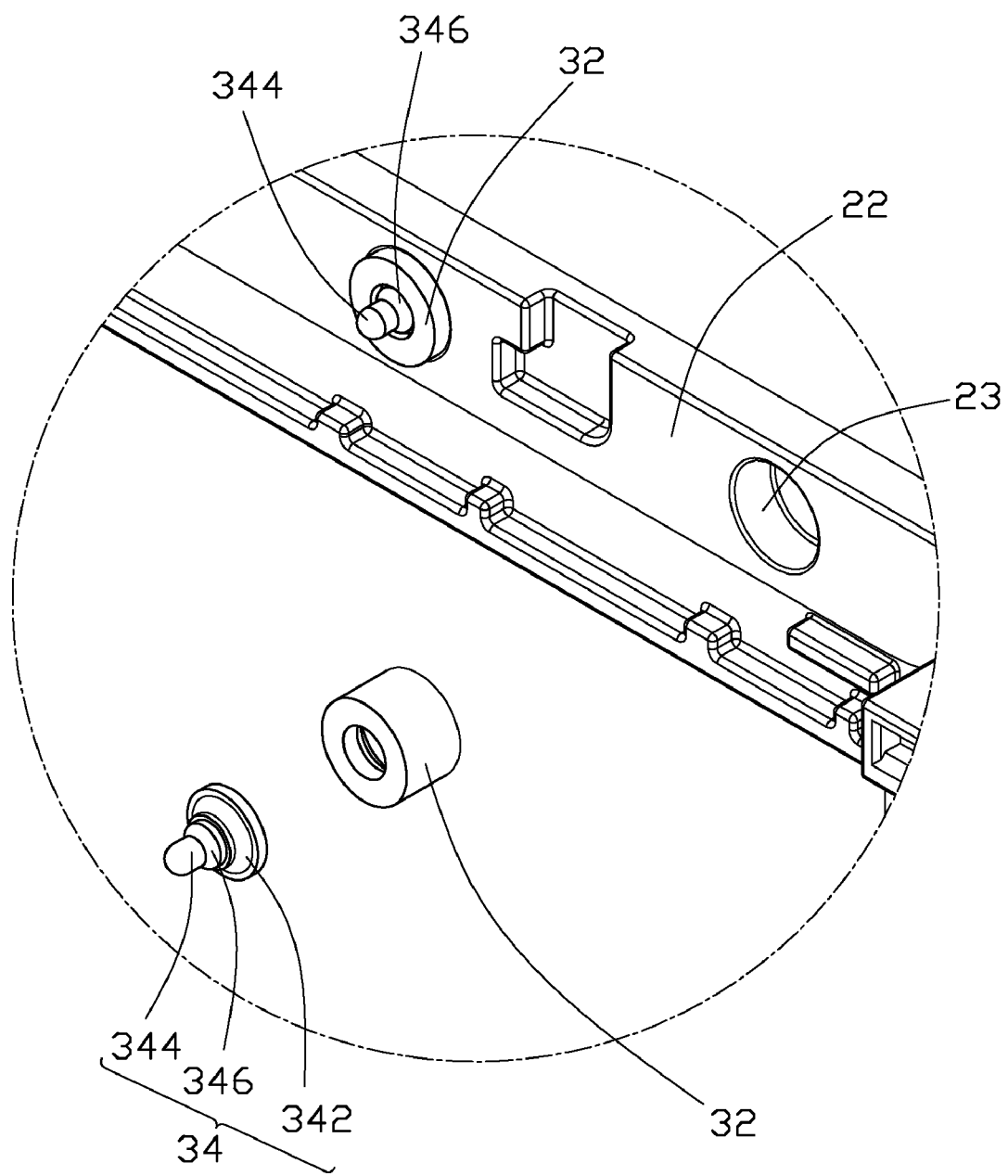
FIG. 2 is an enlarged isometric view of a circled portion II of FIG. 1

Referring to FIG. 2, each fastener 30 includes an elastic portion 32 made of conductive plastic material, and a fixing portion 34 made of metal extending from the elastic portion 32. The fixing portion 34 includes a base 342 molded in the elastic portion 32, and a pin 344 perpendicularly extending from the base 342. An arcuate flange 346 around the pin 344 is formed on a joint of the pin 344 and the base 342. The pin 344 and the flange 346 are exposed out of the one side of the elastic portion 32. Thickness of each elastic portion 32 is greater than the depth of the corresponding recess 23 of the bracket 20.

The elastic portions 32 of the fasteners 30 are inserted into the recesses 23 of the bracket 20 respectively, and air between the elastic portions 32 and the corresponding recesses 23 is vented out from the venting holes 232 respectively. Thereby, the elastic portions 32 are tightly fixed in the recesses 23 respectively, and the part of each elastic portion 32 adjoining with the corresponding pin 344 and the flange 346 thereon is exposed out of the corresponding recess 23. The pins 344 are perpendicular to the side plates 21, 22. In another embodiment, the elastic portions 32 of the fasteners 30 are coated with paste to be tightly fixed in the recesses 23 of the bracket 20 respectively.

Figure 3:
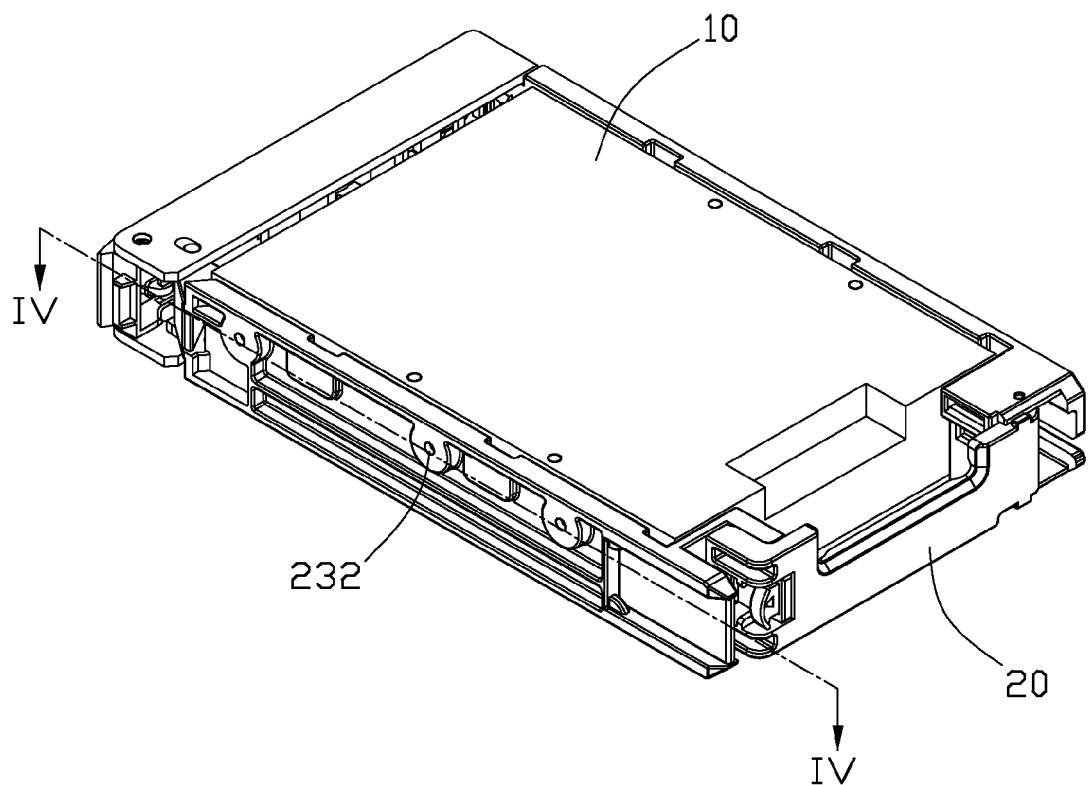
FIG. 3 is an assembled view of FIG. 1.

Referring to FIGS. 1 and 3, in assembly, the pivoting plate 26 is pivotably opened relative to the side plates 21, 22, and then the side plate 21 is pivoted away from the side plate 22. The storage device 10 is placed in the bracket 20, with one end of the storage device 10 abutting against the end plate 24, and the pins 344 of the fasteners 30 on the side plate 22 engaging in the fixing holes 124 of the corresponding lateral side 12 of the storage device 10 respectively. Thereafter, the side plate 21 is pivoted toward the side plate 22, and the pins 344 of the fasteners 30 on the side plate 21 engage in the fixing holes 124 of the other lateral side 12 of the storage device 10 respectively. The pivoting plate 26 is rotated toward the storage device 10 to engage with the side plate 21. Thereby, the bracket 20 is closed, and the storage device 10 is locked in the bracket 20.

Figure 4:
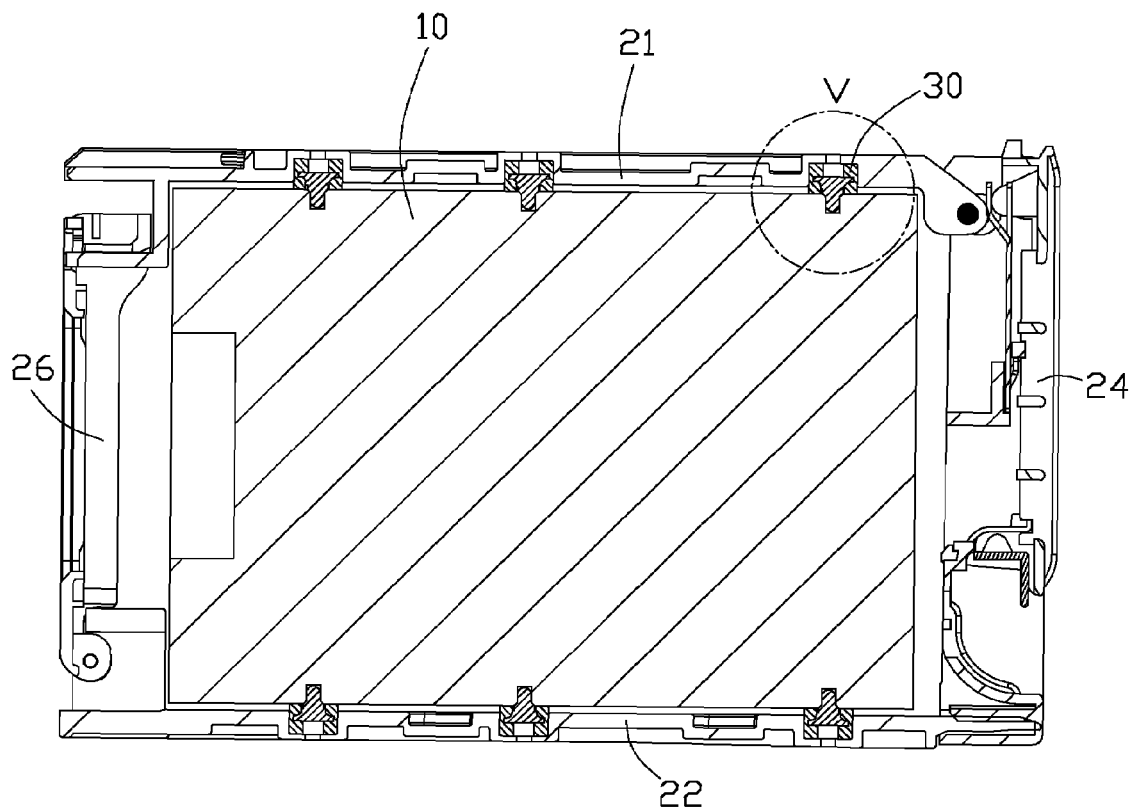
FIG. 4 is a cross-sectional view taken along line IV-IV of FIG. 3.
Figure 5:
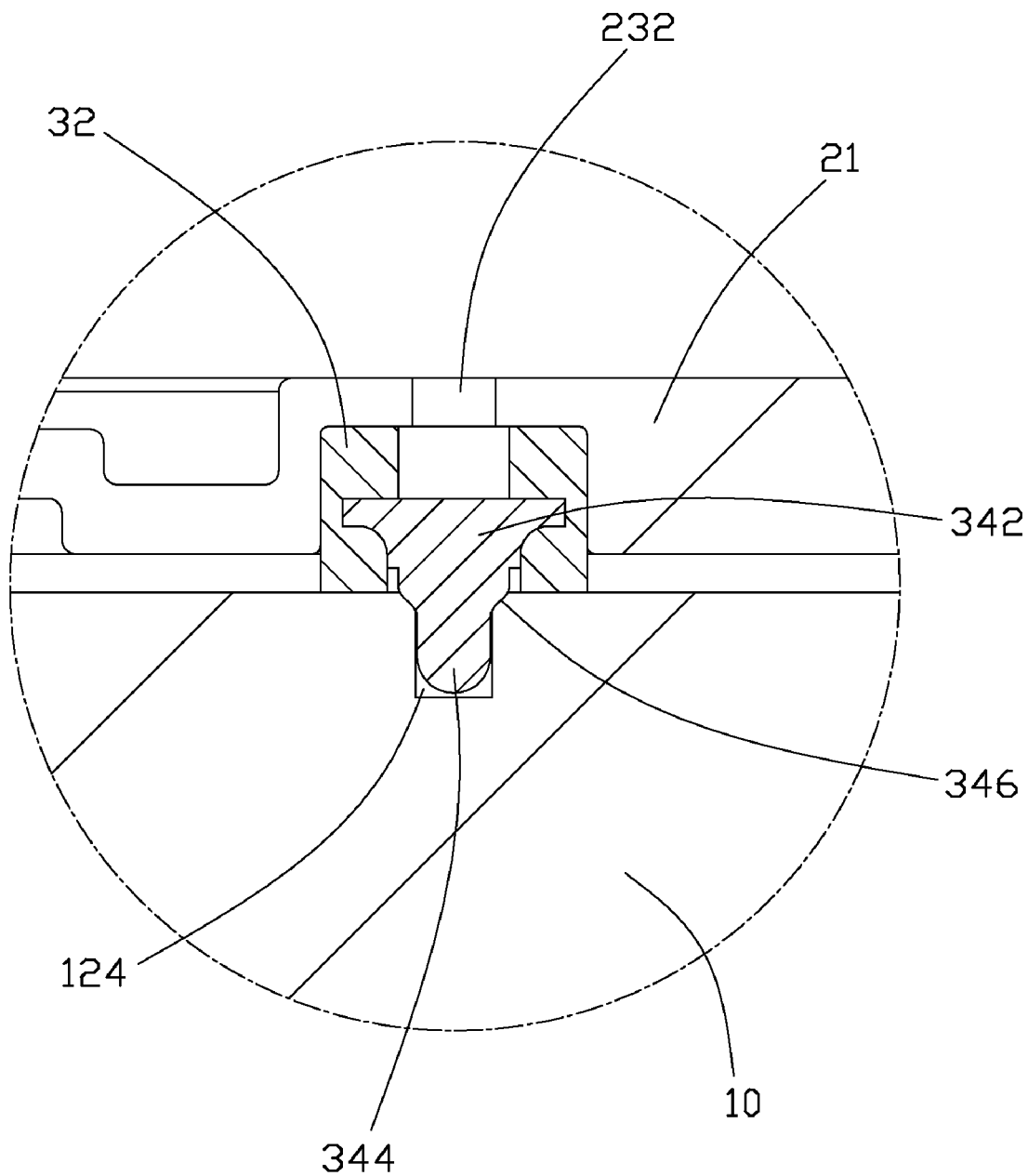
FIG. 5 is an enlarged isometric view of a circled portion V-V of FIG. 4.

Referring to FIGS. 4 and 5, when the storage device 10 is locked in the bracket 20, the parts of the elastic portions 32 exposed out of the corresponding recesses 23 of the side plates 21, 22 resiliently engage with the lateral sides 12 of the storage device 10 respectively. The storage device 10 is protected from left and right shaking by the elastic portions 32. The arcuate flanges 346 around the pins 344 of the fasteners 30 engage with portions of the lateral sides 12 of the storage device 10 bounding the fixing holes 124, for protecting the storage device 10 from up and down, front and back shaking.

Because the fixing portions 34 of the fasteners 30 are made of metal, and the elastic portions 32 are made of conductive plastic material, the storage device 10 can be connected to ground via the fixing portions 34, the elastic portions 32, and the conductive bracket 20.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mounting apparatus for a storage device, the storage device comprising two lateral sides each defining at least one fixing hole, the mounting apparatus comprising:
   a conductive bracket comprising two side plates; and
   at least one fastener installed on an inside surface of each of the side plates, each fastener comprising a conductive elastic portion fixed to the corresponding side plate, and a conductive fixing portion extending from the elastic portion and perpendicular to the corresponding side plate, the elastic portions engaging with the lateral sides of the storage device respectively, the fixing portions engaging in the fixing holes of the storage device respectively.

2. The mounting apparatus as claimed in claim 1, wherein each fixing portion comprises a base molded in the corresponding elastic portion, and a pin perpendicularly extending from the base and exposed out of the elastic portion.

3. The mounting apparatus as claimed in claim 2, wherein an arcuate flange is formed on a joint of each pin and the corresponding base, the flange is around the pin and engages with a portion of the corresponding lateral side of the storage device bounding the fixing hole therein.

4. The mounting apparatus as claimed in claim 1, wherein the elastic portions are made of electrically conductive plastic material.

5. The mounting apparatus as claimed in claim 1, wherein the inside surface of each of the side plates defines at least one recess corresponding to the fixing holes of the storage device, the elastic portions of the fasteners are tightly fixed in the recesses of the side plates and are partially exposed out of the recesses respectively.

6. The mounting apparatus as claimed in claim 5, wherein paste is coated between the elastic portions and the corresponding recesses of the side plates.

7. The mounting apparatus as claimed in claim 6, wherein an outside surface of each of the side plates defines at least one venting hole communicating with the corresponding recess.

8. The mounting apparatus as claimed in claim 1, wherein the bracket is made of metal or plastic material attaching with metal.

9. The mounting apparatus as claimed in claim 1, wherein the fixing portions are made of metal.

* * * * *